No. 655,090. Patented July 31, 1900.
O. O. KITTLESON.
AUTOMATIC LUBRICATOR.
(Application filed Mar. 1, 1900.)
(No Model.) 2 Sheets—Sheet 1.
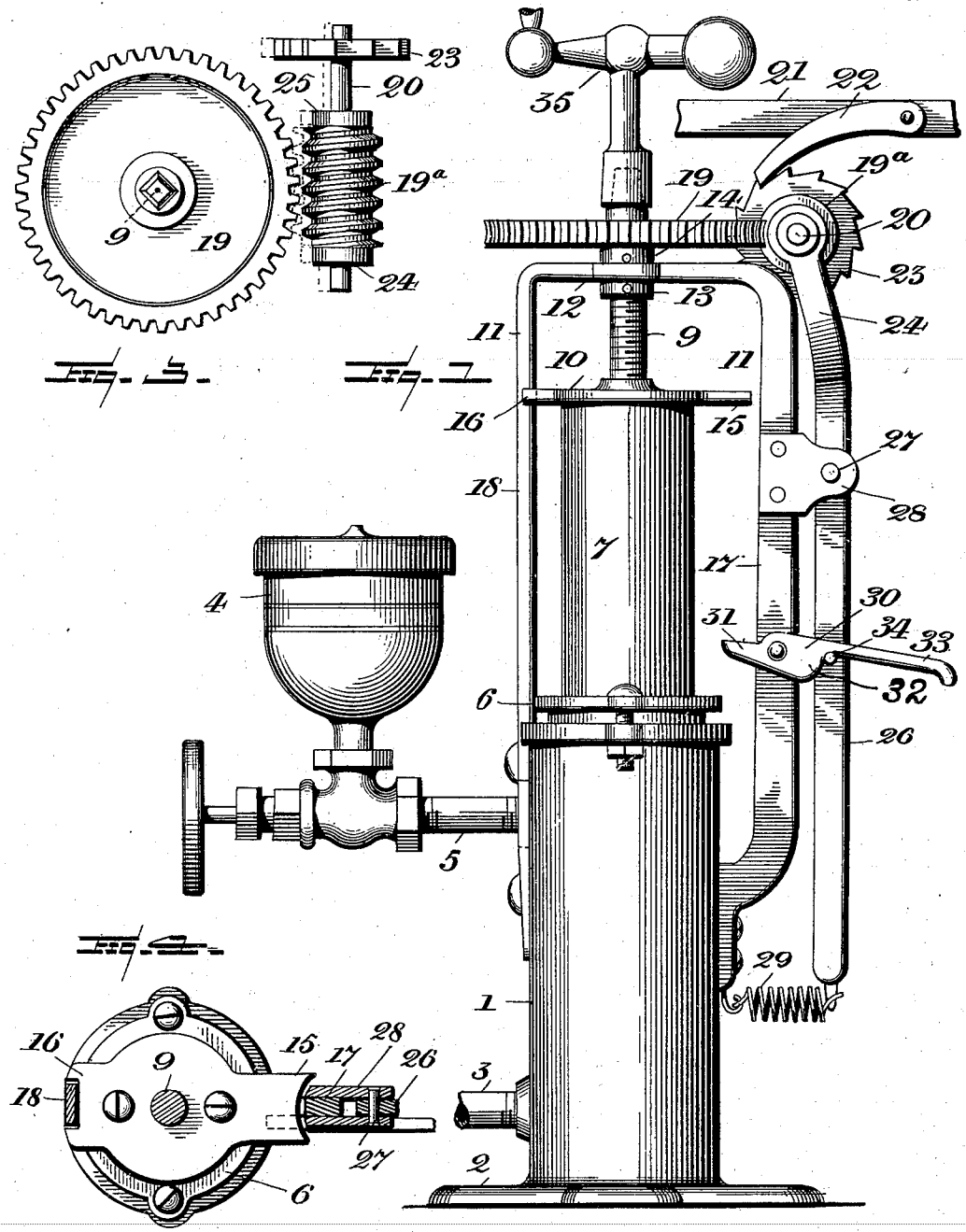
Witnesses:
L. C. Hills
Wm. D. Deane
Inventor
Ole O. Kittleson
By Louis G. Julihn
his Attorney

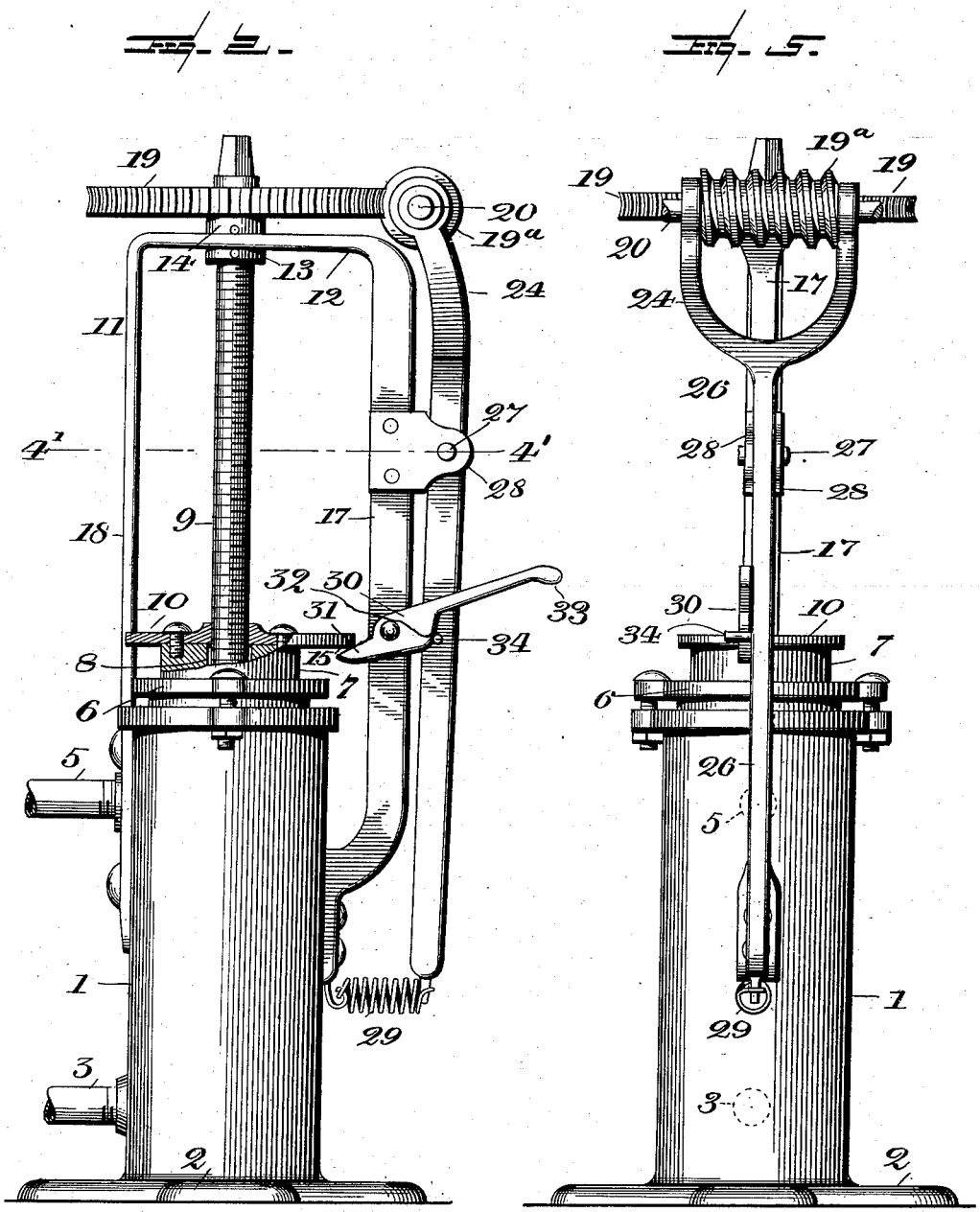

UNITED STATES PATENT OFFICE.

OLE O. KITTLESON, OF LEE, ILLINOIS.

AUTOMATIC LUBRICATOR.

SPECIFICATION forming part of Letters Patent No. 655,090, dated July 31, 1900.

Application filed March 1, 1900. Serial No. 7,011. (No model.)

*To all whom it may concern:*

Be it known that I, OLE O. KITTLESON, a citizen of the United States, residing at Lee, in the county of Lee and State of Illinois, have invented certain new and useful Improvements in Automatic Lubricators; and I do hereby declare the following to be a full, clear, and exact description of the invention, such as will enable others skilled in the art to which it appertains to make and use the same.

My present invention relates to improvements in automatic lubricators for use in any connection where a positive feed of oil under pressure is necessary or desirable.
The object of the invention is to produce a simple and inexpensive yet durable device of this class embodying an oil-cylinder supplied with oil from a suitable reservoir fitted with valved delivery-pipes and containing a feed-plunger operated by actuating mechanism connected to and operated by a moving element of the engine or other machinery to be oiled and automatically stopped or thrown out of gear when the plunger has reached the limit of its pressure-stroke.

To this end the device consists of a compact organization of the elements enumerated, in connection with others, constructed and arranged in a manner to be hereinafter fully described and illustrated.

In the accompanying drawings, Figure 1 is a side elevation of my lubricator or oiler in gear and feeding. Fig. 2 is a sectional elevation with the plunger at the limit of its feed or pressure stroke and in the act of tripping the automatic stop. Fig. 3 is a top plan view showing the worm out of gear in dotted lines. Fig. 4 is a horizontal sectional view on the line 4' 4' of Fig. 2, and Fig. 5 is an elevation looking toward the worm and automatic stop.

Referring to the numerals of reference indicating corresponding parts in the several views, 1 indicates the pressure-cylinder of my lubricator, mounted upon a suitable base 2, and from which adjacent to its bottom is led a valve-controlled oil-delivery pipe 3. Oil is supplied to this cylinder from an oil-reservoir 4, carried by a valve-controlled oil-supply pipe 5, extending through the wall of the cylinder above the delivery-pipe and preferably just below the stuffing-box 6, fitted in the upper end of the cylinder to insure an oil-tight connection with the feed-plunger 7, designed to be gradually but positively urged within the cylinder to cause the expulsion of the oil through the delivery pipe or pipes to the part intended to be lubricated. The plunger is provided with an axial bore 8 for the reception of the feed-screw 9, having a thread engagement with a head-plate 10, bolted or otherwise secured upon the upper end of the plunger and pierced by the screw. If preferred, however, the head-plate may be omitted and the bore threaded for engagement with the feed-screw.

An inverted-U-shaped bearing-frame 11 is terminally bolted to diametrically-opposite sides of the cylinder, and its horizontal bar 12, located above the cylinder, constitutes a bearing for a smooth cylindrical portion of the screw, which is retained against longitudinal movement by collars 13 and 14, keyed thereon above and below the bar. Lugs 15 and 16 extend horizontally from the upper end of the plunger, being preferably formed upon the head-plate 10. The lug 15 extends toward the vertical bar 17. The lug 16 is recessed to receive the vertical bar 18 and travels thereon and guides the upper end of the plunger as the same is reciprocated by mechanism hereinafter described. This screw-actuating mechanism comprises a worm-wheel 19, keyed upon the feed-screw above the bar 12 and which meshes with a worm 19ª, carried by a worm-shaft 20 and actuated by any suitable means—as, for instance, a swinging arm 21, designed to be connected to a reciprocating element of the engine and carrying a pawl 22, engaging the teeth of a ratchet-wheel 23, fixed upon the worm-shaft. As the arm 21 is oscillated by the operation of the engine or other machine the worm shaft and wheel will be given a step-by-step rotation, which in turn effects the gradual rotation of the worm-wheel and feed-screw and the steady positive depression of the plunger to force the oil or other lubricant through the delivery pipe or pipes to the part to be lubricated. Mechanism for accomplishing this general result has been devised heretofore; but the attention of an operator has been required to stop the feed. My invention in its primary aspect therefore comprehends a novel automatic stop for automatically throwing the feed-screw out of gear with its actuating mechanism when the plunger reaches the limit of its feed-stroke. To accomplish this, I journal the worm-shaft 20 in terminal bifurcations 24 and 25 of a vertical worm-frame 26, mounted adjacent to its upper end upon a horizontal pintle 27, passed through a pair of lugs 28, projecting from the frame-bar 17, and having its lower extremity constantly urged toward the cylinder by a stout spring 29, having its opposite ends secured to the frame 26 and to the cylinder or other fixed part. The action of this spring when unopposed serves to swing the worm-frame and to move the worm-wheel out of gear with the worm, whereby to stop the feed of the plunger. The provision of a device for retaining the worm in mesh against the resistance of the spring is therefore necessary. This device is that element of the invention which I designate the "automatic stop," and it comprises a set-lever 30, fulcrumed upon the bar 17 and provided with a nose 31 and a cam-face 32 at opposite sides of the fulcrum, and a handle 33, projecting beyond the cam, for facilitating the actuation of the lever by hand when desired. A pin 34 projects from the worm-frame into the path of the cam-face 32, so that when the set-lever is depressed into the horizontal position the cam-face will impinge against the pin and urge the lower end of the frame against the resistance of the spring and will move the worm into gear with the worm-wheel, as shown in Fig. 1 of the drawings. With the parts in this position the plunger will be gradually depressed until at the limit of its stroke the lug 15, which is a trip-lug, strikes the nose, depressing it and swinging the set-lever to elevate the cam-face from contact with the pin. This tripping of the set-lever releases the worm-frame, which is swung under the impulse of the spring to put the feed-screw out of gear by the removal of the worm from the worm-wheel. Thus the oil supplied to the cylinder from the reservoir will be fed under pressure through the delivery-pipe, and when the plunger reaches the limit of its stroke the entire device will be automatically thrown out of gear and breakage or derangement of the parts will be prevented. The feed-screw may now be rotated in the reverse direction and the plunger elevated by means of a crank 35 at the top of the screw. When it is desired to begin the feeding of a new charge of oil, the handle of the set-lever is depressed, causing the device to be thrown into gear, as heretofore described, and the operation of feeding the oil and automatically stopping the feed is repeated; but while the structural organization and arrangement herein illustrated and described is thought at this time to be preferable I do not limit myself thereto, but reserve the right to effect such changes, modifications, and variations as may fall properly within the scope of the protection prayed.

Therefore what I claim, and desire to secure by Letters Patent, is—

1. In an automatic lubricator, the combination with a cylinder, plunger, feed-screw and worm-wheel carried by the latter, of a worm, a movable support for the worm tending to throw the latter out of engagement with the worm-wheel, and means operated by the plunger on the descent thereof, to release the said support and thereby permit the worm to disengage the worm-wheel.

2. In an automatic lubricator, the combination with a cylinder, plunger, feed-screw and worm-wheel carried by the latter, of a worm, a pivoted spring-urged worm-frame, a set-lever in operative relation with the worm-frame and means carried by the plunger for tripping the set-lever.

3. The combination with a cylinder, plunger, feed-screw and worm-wheel carried by the latter, of a worm, a pivoted worm-frame, means for urging the frame to throw the worm out of gear with the worm-wheel, a pin projecting from the frame, a set-lever comprising a nose and a cam-face engaging the pin and a trip-lug carried by the plunger and movable in a path obstructed by the nose of the set-lever.

In testimony whereof I affix my signature in presence of two witnesses.

OLE O. KITTLESON.

Witnesses:
 THOS. NELSON,
 JENNIE KITTLESON.